United States Patent [19]

Culliford

[11] Patent Number: 4,541,346
[45] Date of Patent: Sep. 17, 1985

[54] ROTARY HIGH TEMPERATURE REACTOR

[75] Inventor: Michael D. Culliford, Retford, England

[73] Assignee: N. D. Engineering Limited, Doncaster, England

[21] Appl. No.: 551,924

[22] Filed: Nov. 15, 1983

[30] Foreign Application Priority Data

Nov. 16, 1982 [GB] United Kingdom ............... 8232627

[51] Int. Cl.⁴ ............................. F23G 5/06; F27B 7/36
[52] U.S. Cl. .................................... 110/246; 432/105; 432/112; 432/113
[58] Field of Search ................ 110/246; 432/105, 107, 432/112, 113

[56] References Cited

U.S. PATENT DOCUMENTS

| | | | |
|---|---|---|---|
| 2,020,960 | 11/1935 | Pehrson et al. | 432/105 |
| 3,242,888 | 3/1966 | Klovers et al. | 110/246 |
| 3,822,651 | 7/1974 | Harris et al. | 110/246 |
| 3,995,988 | 12/1976 | Freze | 432/105 |
| 4,037,543 | 7/1977 | Angelo | 110/246 |
| 4,083,752 | 4/1978 | Bielski et al. | 110/246 |
| 4,091,748 | 5/1978 | Mansfield | 110/228 |
| 4,140,478 | 2/1979 | Kawakami et al. | 432/113 |
| 4,191,530 | 3/1980 | Bearce | 432/112 |
| 4,226,584 | 10/1980 | Ishikawa | 110/246 |
| 4,266,931 | 5/1981 | Struckmann | 432/113 |
| 4,376,343 | 3/1983 | White et al. | 432/107 |
| 4,411,204 | 10/1983 | Hamilton | 110/347 |

FOREIGN PATENT DOCUMENTS 269892 5/1928 United Kingdom .
655014 7/1951 United Kingdom .
905659 9/1962 United Kingdom .

Primary Examiner—Henry C. Yuen
Attorney, Agent, or Firm—Fleit, Jacobson, Cohn & Price

[57] ABSTRACT

A rotary drum 2 is provided with vanes 26 extending longitudinally thereof defining passages 21 therebetween with gas to be fed to the reactor being fed only to those of the passages 21 the outlets from which into the reactor are covered by the solid material 20 being tumbled therein. Within this arrangement it can be ensured that the hot gases being used to treat the solid materials can be passed through the solid material as it is being tumbled in the reactor with the reactor being capable of accepting a large range of different materials with a variation of particle and lump size. The reactor in its preferred exemplary form is used for starved air incineration of waste materials, the gas supply means being used to supply gas in an amount insufficient to complete the reaction in the drum such that combustible gases leave the outlet end for use in the burner 10 used to provide the hot gases to the reactor drum.

7 Claims, 3 Drawing Figures

ROTARY HIGH TEMPERATURE REACTOR

DESCRIPTION

This invention relates to an improved reactor for heating solid material to a high temperature. An example of a process to which the reactor of the present invention may be applied is in the incineration of solid combustible waste.

Such reactors are frequently required to operate at temperatures up to 1000° C. Hitherto such high temperature process operations have been carried out in long rotary refractory lined kilns which tend to be very large, to be expensive to construct, and to be thermally inefficient. More energy efficient machines are available for high temperature processes, for example fluidised bed reactors and shaft preheaters and coolers; however the size and type of material suitable for processing in such equipment is limited. Travelling grate preheaters and coolers that are energy efficient and do accept a wide variation in material size and type are very expensive to manufacture and mechanically complex. The present invention is directed at providing a mechanically simple rotary reactor which has a thermal efficiency which shows improvement of fifty percent or more over that of a refractory lined rotary kiln and which is capable of handling a very diverse range of material types and sizes.

While rotary driers, coolers and furnaces have been proposed, as shown in British Patent Specifications Nos. 269892, 655014 and 905659, in which a horizontally disposed rotary cylinder is provided with a circumferential series of louvres through which treatment gas may be passed to solid material to be treated in the drum, these have not been capable of starved air incineration. Starved air incineration plants hitherto known have been intermittently fed by means of rams pushing the combustible waste into the combustion chamber at preset time intervals. Ash must then be removed either manually by shovel or by a further set of rams pushing the ash out of the combustion chamber.

According to the present invention there is provided a rotary high temperature reactor comprising a rotary drum of heat resistant material mounted for rotation about a substantially horizontal axis, said drum comprising a peripheral shell and a plurality of vanes extending longitudinally of and within said shell to define passages closed at their radially outer side by the shell and open at their radially inner side; means for rotating the drum; means for feeding solid material to be treated into one end of the drum; means for collecting treated solid material from the other end of the drum, the drum being adapted, upon rotation, to feed solid material from the inlet to the outlet end thereof; and means for feeding gas for treatment of the solid material into the ends of the passages defined between the vanes, such gas feeding means being adapted to feed the gas only into those passages which at that particular time, during use of the reactor, are covered by solid material being tumbled in the drum, characterized in that said gas feeding means is adapted to supply hot gas in an amount insufficient to complete the reaction in the drum such that combustible gases are given off from the outlet end of the drum during use of the reactor; means are provided for supplying additional air to the exhaust gases from the drum and feeding the resulting mixture to a burner to complete combustion thereof; and means are provided for supplying part of the flue gas from the burner to the hot gas feeding means.

Preferably the vanes each have a flange at their inner end extending in a substantially circumferential direction to resist the entry of solid material being treated in the drum into the passages between the vanes.

The invention will be further described, by way of example, with reference to the accompanying drawings, in which.

Figure 1:
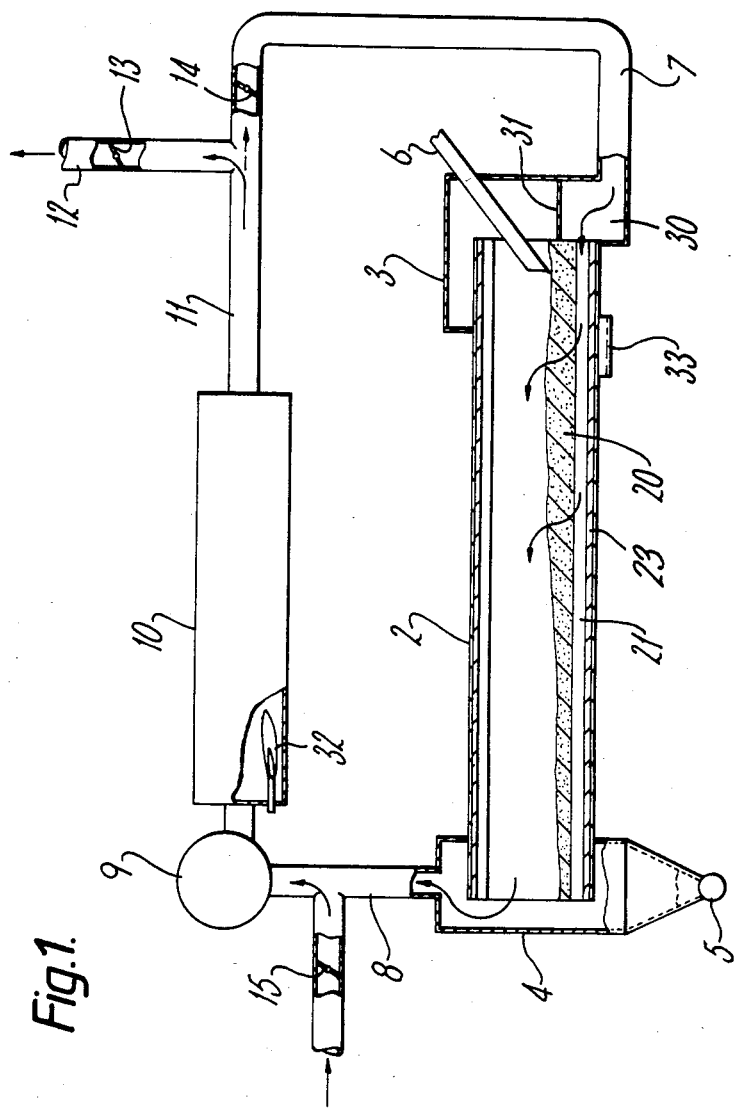
FIG. 1 is a schematic illustration of a starved air combustion system utilizing the present invention.

Referring to FIG. 1 the rotary reactor is shown as comprising a drum 2 mounted for rotation about a substantially horizontal axis. Diagrammatically illustrated at 33 is a supporting roller driven to rotate the drum slowly during use thereof.

The reactor extends between an inlet chamber 3 and an outlet chamber 4, the outlet chamber being provided with a solids discharge means 5 and the inlet chamber being provided with a solids inlet chute 6. The conduit 7 provides a supply of hot gas to the reactor while a conduit 8 leads from the chamber 4 to a fan 9. A supply of fresh air is fed via a control valve 15 to the conduit 8. The mixture of hot exhaust gases from the reactor 2 and the fresh air is supplied via the fan 9 to a burner 10 in which the combustible gases are ignited by the flame 32 and burned in an excess of air to provide flue gases which are fed to a conduit 11 leading to a flue 12 via a control valve 13 and to the conduit 7 via a control valve 14. With the reactor in operation the butterfly vanes of the valves 13, 14 and 15 are controlled so as to provide an adequate supply of air to the burner 10 and also so as to divide the flow of flue gas from the conduit 11 that hot gases are supplied to the conduit 7 containing about fifty percent of the air required for complete combustion of the solid materials in the reactor. Starved air combustion of this type ensures that the burning bed of material in the primary combustion chamber reaches a very high temperature, giving complete burn-out and, in the case of contaminated waste, a sterile and non-toxic ash. Starved air incineration can only truly be achieved by passing the combustion air through the bed of combustible material and hitherto this has only been possible in batch or intermittent operating machines. Prior rotary refractory lined incinerators where the combustion air passes over, not through, the bed of combustible material does not genuinely achieve this requirement. According to the operation of the illustrated system functioning as a continuous rotary starved air incinerator combustible waste is introduced at the feed end of the cylinder via the chute 6 and ash is continuously discharged into the chamber 4 from the discharge end of the rotary drum. Combustion air at fifty percent stoichiometric is passed through the tumbling bed of waste in the drum and the combustible and volatile gases given off are further burned to completion in the afterburner 10.

The ability to pass the gas through the material in the drum rather than over the top of it is achieved by the provision of vanes 26 defining passages 21 extending longitudinally of the drum for conducting the inlet gases so that they are discharged through the tumbling solid material in the drum.

Figure 2:
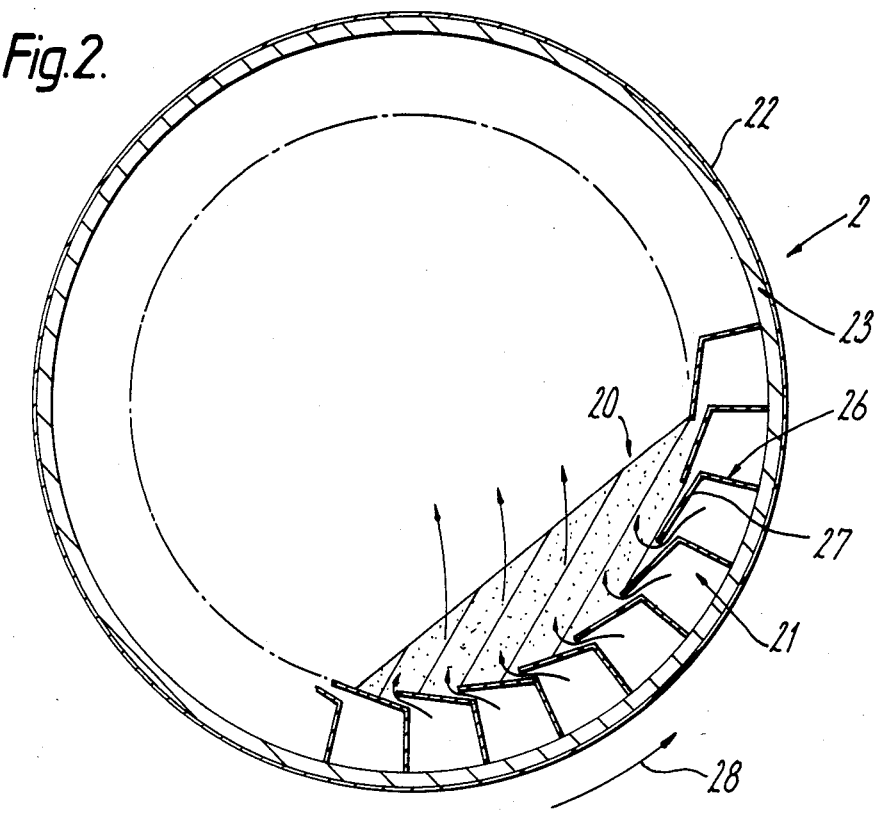
FIG. 2 is a diagrammatic cross-section view to a larger scale taken through the rotary reactor included in the system of FIG. 1.

As can be seen in FIG. 2 the drum 2 is shown as comprising an outer heat resisting steel casing 22 lined with refractory material 23 and provided around its internal surface with circumferentially spaced longitudinally extending vanes 26, the passages 21 being defined between successive vanes. At the radially inner edge of each of the vanes 26 there is provided a flange 27 extending in a circumferential direction towards, preferably to overlap, the edge of an immediately adjacent vane. Gas outlet slits are defined between the edges of the flange 27 and the vanes 26 overlapped thereby. The gas outlet slits between the vanes may either extend continuously for the full length of the reactor or may be in the form of shorter slits with connections between adjacent vanes being provided intermittently along the reactor for strengthening purposes.

As will be appreciated from FIG. 2, upon rotation of the drum in a counter clockwise direction, as indicated by arrow 28, the solid material in the drum 20 will occupy a position somewhat as shown so that the overlapping flanges 27 tend to prevent the solid material from falling into the passages 21 and, in any event, upon continued rotation of the rotary drum as the passages approach the top of the drum any material which may find itself therein will fall out and back into the main volume of the reactor drum.

Figure 3:
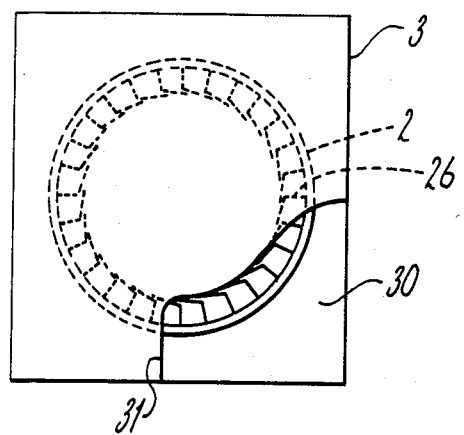
FIG. 3 is a diagrammatic end view showing the manner in which gas is fed to the rotary reactor.

The gas supplied from the conduit 7 passes to a plenum chamber 30 so communicating with the ends of the passages 21 that gas is supplied only to those of the passages 21 the outlets from which are covered by the tumbling solid material in the drum. FIG. 3 illustrates how the plenum chamber 30 is defined by a barrier 31 to ensure that the gas to be passed through the solid material in the reactor is only supplied to the required ones of the heater passages having the outlets covered by the tumbling solid material in the drum. It will be apparent that various alternative ways may be adopted for feeding the gas to the appropriate ones of the exposed passages 21; thus instead of the curved barrier 31 shown, a straight barrier in a form of a sector cutting across the lower righthand portion of the periphery of the drum could be provided or any other suitable form, for example a stationary end plate covering the reactor drum and provided with a slot at an appropriate location thereon, may be used to provide communication with the required ones only of the passages 21.

Normally the reactor drum 2 will be rotated about a slightly downwardly inclined axis so as to cause continuous flow and movement of the solid material from the feed to the discharge end of the drum. However alternative, or additional, feed arrangements could be used, for example, the vanes themselves may be so shaped as to provide a driving motion to cause material to move along the drum consequent upon rotation thereof. In order to allow the reactor to cope with different materials it is preferred that it rely upon inclination of the drum axis to cause the flow of solid material with the inclination and the speed of the drum being variable as required.

Instead of being fabricated from a refractory lined mild steel shell the drum could be fabricated from a heat resisting steel or other metal, depending upon the drum size and operating temperature. The vanes themselves also may be either fabricated from heat resisting steels or other metals or be cast in a refractory material. The number of vanes provided around the drum circumference will depend upon the drum diameter and also upon the treatment required, but typically, the number of vanes may be 24 to 48. During use of the reactor the gentle turning over of material during its passage through the reactor during slow rotation of the drum ensures uniform contact between the gas and solids and the minimum of particle breakage, thus keeping dusting down to a minimum.

While the reactor drum has been illustrated as being cylindrical it will be appreciated that this is not essential and is some applications it may be of other shapes, in particular frusto-conical with the lowermost generator of the frustum being downwardly inclined from the inlet to the outlet end of the drum.

I claim:

1. In a rotary high temperature reactor comprising a rotary drum of heat resistant material mounted for rotation about a substantially horizontal axis, said drum comprising a peripheral shell and a plurality of vanes extending longitudinally of and within said shell to define passages closed at their radially outer side by the shell and open at their radially inner side; means for rotating the drum; means for feeding solid combustible material to be treated into one end of the drum; means for collecting treated solid material from the other end of the drum, the drum being adapted, upon rotation, to feed solid material from the inlet to the outlet end thereof; and means for supplying gas for treatment of the solid material into the ends of the passages defined between the vanes, such gas supplying means being adapted to supply the gas only into those passages which at that particular time, during use of the reactor, are covered by said material being tumbled in the drum, the improvement comprising:
   (a) the gas supply means being adapted to supply hot gas to the drum and through the solid material, the gas having insufficient air to complete the combustion of solid materials in the drum but having a temperature sufficient to liberate combustible gases from the solid material, the combustible gases being given off from the outlet end of the drum during use of the reactor;
   (b) burner means for supplying hot gas to said gas supply means, and valve means for supplying part only of the hot gas from the burner to the gas supply means;
   (c) conveying means for conveying the combustible gases from the drum to said burner means;
   (d) means for supplying additional air to the combustible gases given off from the outlet end of the drum and for feeding the resulting air-combustible gas mixture to said burner means to complete the combustion thereof and to provide hot gas for the gas supply means; and
   (e) the vanes within the shell of the drum each having a flange at their inner end, said flanges extending in a substantially circumferential direction opposite to the direction of rotation of the drum to resist the entry into the passages between the vanes of solid material being treated in the drum, each flange substantially overlapping an immediately adjacent vane to define circumferentially directed gas outlet slits between the edges of the flanges and the vanes overlapped thereby.

2. A reactor according to claim 1, wherein the drum is made of heat resisting steel.

3. A reactor according to claim 1, wherein the drum is in the form of a metal shell lined with refractory material.

4. A reactor according to claim 1, wherein the vanes are of heat resistant metal.

5. A reactor according to claim 1, wherein the vanes comprise refractory material.

6. A reactor according to claim 1, wherein the axis of the rotary drum is inclined for feeding of solid material from the inlet to the outlet end thereof.

7. A reactor according to claim 1, wherein the vanes are themselves so shaped as to cause solid material to be advanced through the drum upon rotation thereof.

* * * * *